United States Patent

[11] 3,592,052

[72] Inventors Giulio Di Giacomo;
 Solomon Goldspiel; William J. Jones, all of Brooklyn, N.Y.
[21] Appl. No. 789,727
[22] Filed Jan. 8, 1969
[45] Patented July 13, 1971
[73] Assignee The United States of America as represented by the Secretary of the Navy

[54] ULTRASONIC CRACK DEPTH MEASUREMENT
 3 Claims, 2 Drawing Figs.
[52] U.S. Cl. .................................................. 73/67.8
[51] Int. Cl. .......................................... G01n 29/04
[50] Field of Search ........................................ 73/67.8

[56] References Cited
UNITED STATES PATENTS
2,846,875  8/1958  Grabendorfer ............... 73/67.8
FOREIGN PATENTS
1,414,865  9/1965  France .......................... 73/67.8
1,075,338  2/1960  Germany ...................... 73/67.8

OTHER REFERENCES
An article from ULTRASONICS January-March, 1965 entitled " Practical Industrial Ultrasonic Examination" by Abrahams (pp. 30—35)
An article entitled " Pictorial System for Charting Flaws" by Scott from ULTRASONICS July, 1966, pp. 152—6.

Primary Examiner—James J. Gill
Attorneys—Louis A. Miller, Louis B. Applebaum and Ernest F. Weinberger ABSTRACT: Ascertaining the depth of a crack in a welded specimen comprising generating a sonic wave inwardly on one face of the specimen, moving the source of said wave toward or away from said crack until a relatively strong reflection is detected, then moving said source away until the signal amplitude vanishes. The distance between the source and the weld is measured and the source then moved toward the weld until the signal amplitude again vanishes and the distance measured again. With these parameters and knowing the physical dimensions of the specimen the crack depth at the weld is mathematically determined.

INVENTORS.
GIULIO DI GIACOMO
SOLOMON GOLDSPIEL
WILLIAM J. JONES
BY Ernest J. Weinberger
Louis B. Appleton
ATTORNEYS

3,592,052

ULTRASONIC CRACK DEPTH MEASUREMENT

The invention described herein may be manufactured and used by or for the Government of the United States of America for governmental purposes without the payment of any royalties thereon or therefor.

BACKGROUND OF THE INVENTION

1. Field of the Invention

The present invention relates to nondestructive testing and more particularly to the measurement of crack depth of weldments wherein sonic energy is employed to perform the measurement.

2. Description of the Prior Art

In the field of nondestructive testing it has been the general practice to employ sonic energy waves to measure and test various materials and structures. Such prior art devices, however, are unsatisfactory in several regards. Namely, they require extremely well trained, skilled personnel, highly complex and expensive apparatus, difficult initial calibration and are excessively time consuming. The present invention overcomes these inherent disadvantages and fills a present need.

SUMMARY OF THE INVENTION

The general purpose of this invention is to provide a nondestructive method for the measurement of crack depth in metallic weldments that has all the advantages of similarly employed prior art devices and techniques and none of the above-described disadvantages. To attain this, the present invention provides a unique method of measurement wherein a sonic energy beam is angularly directed into a specimen toward the weldment at approximately the skip distance. The beam is now moved perpendicularly away from the weldment until the received signal energy just vanishes. The distance between the beam source and the weldment is observed and the beam source is advanced toward the weldment until the reflected signal again disappears. Knowing these two distances and the sample thickness, the crack depth is readily calculated.

An object of the present invention is to provide a technique for the nondestructive measurement of crack depths in metallic weldments.

Another object is to provide a simple, inexpensive, direct and self-calibrating method for measurement of crack depth which can be performed by relatively unskilled personnel.

Other objects and many of the attendant advantages of this invention will be readily appreciated as the same becomes better understood by reference to the following detailed description when considered in connection with the accompanying drawings, in which like reference numerals designate like parts throughout the figures thereof and wherein:

FIG. 1 is a sectional view through a specimen showing the beam spread and direction for the initial measurement; and FIG. 2 is a sectional view including the beam rays for the final measurement.

DESCRIPTION OF THE PREFERRED EMBODIMENT

Figure 1:
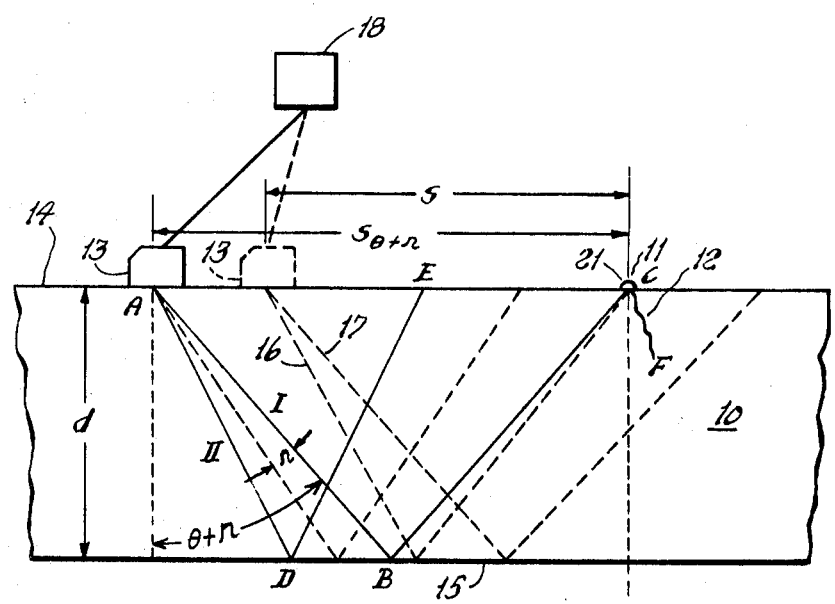

In the illustrated embodiment of FIG. 1 the metallic specimen 10 which may have been welded at 11 in a direction perpendicular to the paper has an inwardly directed crack 12 whose depth is to be ascertained. A source 13 of ultrasonic energy is coupled to the upper face 14 of the specimen at approximately the skip distance S from the weld and the ultrasonic waves travel inwardly of the specimen, strike the lower face 15 of the specimen and are then reflected upwardly toward the crack 12. The outer ray limits are shown as lines 16 and 17. These beams are reflected back from the interfaces and from the crack 12, following the identical paths of transmission. They are detected at a probe in the transducer structure and their amplitude displayed by indicator 18 which includes an oscilloscope. Since the energy reflected from the crack is additive to that normally reflected from the interfaces then the indicated amplitude is a maximum when the energy beam impinges on the entire crack. Conversely, a minimum of energy is detected when the beam does not encounter the crack.

The transducer structure 13 is moved perpendicularly away from the crack or weld until the reflected energy vanishes or just becomes a minimum as when the trailing ray path 20 just strikes the upper edge 21 of the crack. At this point the distance between the probe and the weldment crack $S_{\theta+r}$ is measured. Let $r$ be the beam spread and $\theta$ the probe beam inclination so that:

$$r = \text{arc } \tan \frac{S_{\theta r}}{2d} - \theta \quad (1)$$

where $d$ is the specimen thickness. The sonic path $\Delta_{\theta+r}$ which is ABC therefore becomes:

$$\Delta_{\theta+r} = \frac{2d}{\cos(\theta+r)} \quad (2)$$

Figure 2:
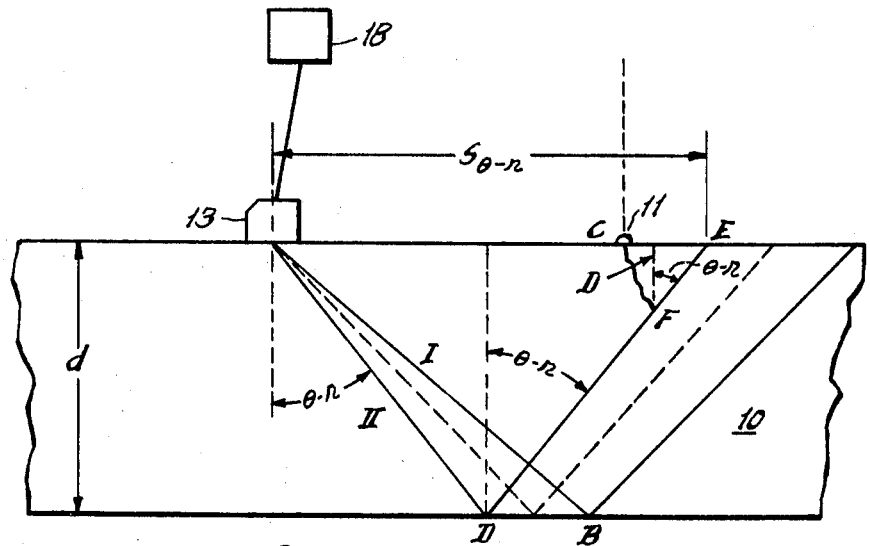

The probe is now advanced toward the weld until the signal amplitude again becomes a minimum or vanishes. This condition is illustrated by way of FIG. 2 wherein the probe distance is now $S_{\theta+r}$ and the beam path of interest is $ADFE$.

$$ADFE = \Delta_{\theta-r} = \Delta FE + \Delta ADF$$

$$\Delta_{\theta-r} = \frac{2d}{\cos(\theta-r)}$$

$$\Delta FE = \Delta_{\theta-r} - \Delta ADF$$

The depth of the crack $D = FE \cos(\theta-r)$ $$D = \left[\frac{2d}{\cos(\theta-r)} - \Delta ADF\right] \cos(\theta-r)$$

$$D = 2d - \Delta ADF \cos(\theta-r)$$

while the distance ADF can be read directly from a scope since the time of transit of the beam is presented thereon. Knowing the velocity of propagation this distance ADF can be either calculated or the scope calibrated directly in distance. It is quite clear, therefore, that the depth of the crack at the weld can be directly ascertained.

Summarizing the entire technique, the probe is placed on the surface of the specimen or the plate at approximately the skip distance to give a strong signal from the toe of the crack. The probe is then moved backward, along a direction perpendicular to the weld, until the signal amplitude almost vanishes. At this position, the probe exit point position (along the specimen surface) is such that the outer ray of the beam bundle is just beginning to reflect. This distance $S_{\theta+r}$, and the corresponding beam configuration are shown in FIG. 1 where the extreme rays of the bundle for the particular transducer, material and coupling are illustrated.

The half beam spread angle, $r$, and the beam path $\Delta_{\theta+r}$ are tabulated for a selected range of values and thus data may be employed to check whether the reflected ray at the skip distance is actually coming from the upper edge of the crack. If such is not the case, this provides information to adjust the scope to correspond to the actual sonic path. The probe is now advanced toward the weld crack until the signal amplitude almost vanishes and with the scope the sonic distance for the forward minimum amplitude can be determined. This is the path to the crack and knowing this distance the crack depth can easily be calculated.

It should be noted that the crack depth is determined independently of precalculated spread and coupling information. In this method, it is assumed that the beam spreads symmetrically about the central ray and that the coupling is invariable at both extremes of the bundle. Results obtained in this manner have confirmed the veracity of these assumptions.

It should be understood, of course, that the foregoing disclosure relates to only a preferred embodiment of the invention and that numerous modifications or alterations may be made therein without departing from the spirit and the scope of the invention as set forth in the following claims.

We claim:

1. A method for determining the depth of a crack at a weld in a metallic plate which comprises:

generating an ultrasonic beam;

directing said beam into said plate in the direction of said weld at approximately the skip distance therefrom;

detecting the return signal;

redirecting said beam perpendicularly away from said weld until a minimum return signal is detected, measuring the distance between the entrance of said beam into said plate and said weld $S_{\theta-r}$ to check said skip distance;

repositioning said beam perpendicularly toward said weld until another minimum return signal is detected;

measuring the distance between the entrance of said repositioned beam and the skip distance from said weld crack $\Delta$;

measuring the sonic distance of said beam for said repositioned beam;

whereby the depth of said crack can be ascertained in accordance with the following equation:

$$D \text{ DEPTH} = 2d \text{ (PLATE THICKNESS)} - \Delta \text{(SONIC DISTANCE)} \times \cos [O-R]$$

2. The method according to claim 1 wherein the sonic beam is coupled directly into said plate.

3. The method according to claim 2 wherein said generating and detecting are coupled to said plate at approximately the same location.